United States Patent
Kang et al.

(10) Patent No.: US 10,154,449 B2
(45) Date of Patent: Dec. 11, 2018

(54) METHOD AND SYSTEM FOR NEIGHBORING ACCESS POINT DISCOVERY BETWEEN MULTI-BAND WIRELESS LAN ACCESS POINTS

(71) Applicant: Electronics and Telecommunications Research Institute, Daejeon (KR)

(72) Inventors: Hyun Duk Kang, Gwangju (KR); Gwang Zeen Ko, Daejeon (KR); Igor Kim, Daejeon (KR); Myung Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 15 days.

(21) Appl. No.: 15/529,013

(22) PCT Filed: Nov. 20, 2015

(86) PCT No.: PCT/KR2015/012514
§ 371 (c)(1),
(2) Date: May 23, 2017

(87) PCT Pub. No.: WO2016/085201
PCT Pub. Date: Jun. 2, 2016

(65) Prior Publication Data
US 2017/0347312 A1    Nov. 30, 2017

(30) Foreign Application Priority Data

Nov. 28, 2014  (KR) .................. 10-2014-0168890
Nov. 17, 2015  (KR) .................. 10-2015-0161305

(51) Int. Cl.
*H04W 48/16*    (2009.01)
*H04W 88/10*    (2009.01)
(Continued)

(52) U.S. Cl.
CPC .......... *H04W 48/16* (2013.01); *H04W 88/10* (2013.01); *H04W 28/16* (2013.01); *H04W 84/12* (2013.01)

(58) Field of Classification Search
CPC ..... H04W 28/16; H04W 48/16; H04W 88/10; H04W 84/12
See application file for complete search history.

(56) References Cited

U.S. PATENT DOCUMENTS

2005/0041616 A1* 2/2005 Ginzburg .............. H04L 1/0021
370/328
2005/0213554 A1* 9/2005 Ginzburg .............. H04L 1/0003
370/349
(Continued)

FOREIGN PATENT DOCUMENTS

EP    2784947 A1    10/2014
EP    2874459 A1    5/2015
(Continued)

OTHER PUBLICATIONS

Hyunduk Kang et al., Inter-BSS Interference in WLANs, IEEE 802.11-14/1178r2, Sep. 15, 2014, pp. 1-22, ETRI, Daejeon, South Korea.

*Primary Examiner* — Benjamin H Elliott, IV
(74) *Attorney, Agent, or Firm* — William Park & Associates Ltd.

(57) ABSTRACT

The present invention relates to a method and a system for discovering an adjacent access point between multi-band wireless LAN access points, and to a method and a system for discovering an adjacent neighboring access point between access points in order to solve an interference problem between the access points in a wireless LAN using multi-bands.

18 Claims, 14 Drawing Sheets

(51) Int. Cl.
*H04W 28/16* (2009.01)
*H04W 84/12* (2009.01)

(56) References Cited

U.S. PATENT DOCUMENTS

| | | | | |
|---|---|---|---|---|
| 2008/0014880 A1* | 1/2008 | Hyon | ............ | H04L 5/0037 |
| | | | | 455/161.1 |
| 2008/0130541 A1* | 6/2008 | Kokku | ............ | H04W 52/34 |
| | | | | 370/311 |
| 2010/0220707 A1* | 9/2010 | Teo | ............ | H04W 74/0816 |
| | | | | 370/343 |
| 2011/0075578 A1* | 3/2011 | Kim | ............ | H04L 45/124 |
| | | | | 370/252 |
| 2011/0143674 A1 | 6/2011 | Lim et al. | | |
| 2011/0149867 A1 | 6/2011 | Rudolf et al. | | |
| 2014/0177546 A1 | 6/2014 | Kang et al. | | |
| 2016/0183172 A1* | 6/2016 | Lee | ............ | H04W 48/06 |
| | | | | 370/329 |
| 2016/0205615 A1* | 7/2016 | Seok | ............ | H04W 48/16 |
| | | | | 370/338 |
| 2017/0026819 A1* | 1/2017 | Xue | ............ | H04W 8/005 |
| 2017/0347312 A1* | 11/2017 | Kang | ............ | H04W 88/10 |

FOREIGN PATENT DOCUMENTS

| | | | |
|---|---|---|---|
| EP | 2884804 | A1 | 6/2015 |
| EP | 2928240 | A1 | 10/2015 |
| KR | 1020100047449 | A | 5/2010 |
| WO | 2013077690 | A1 | 5/2013 |
| WO | 2014011006 | A1 | 1/2014 |
| WO | 2014027829 | A1 | 2/2014 |
| WO | 2014088175 | A1 | 6/2014 |

\* cited by examiner

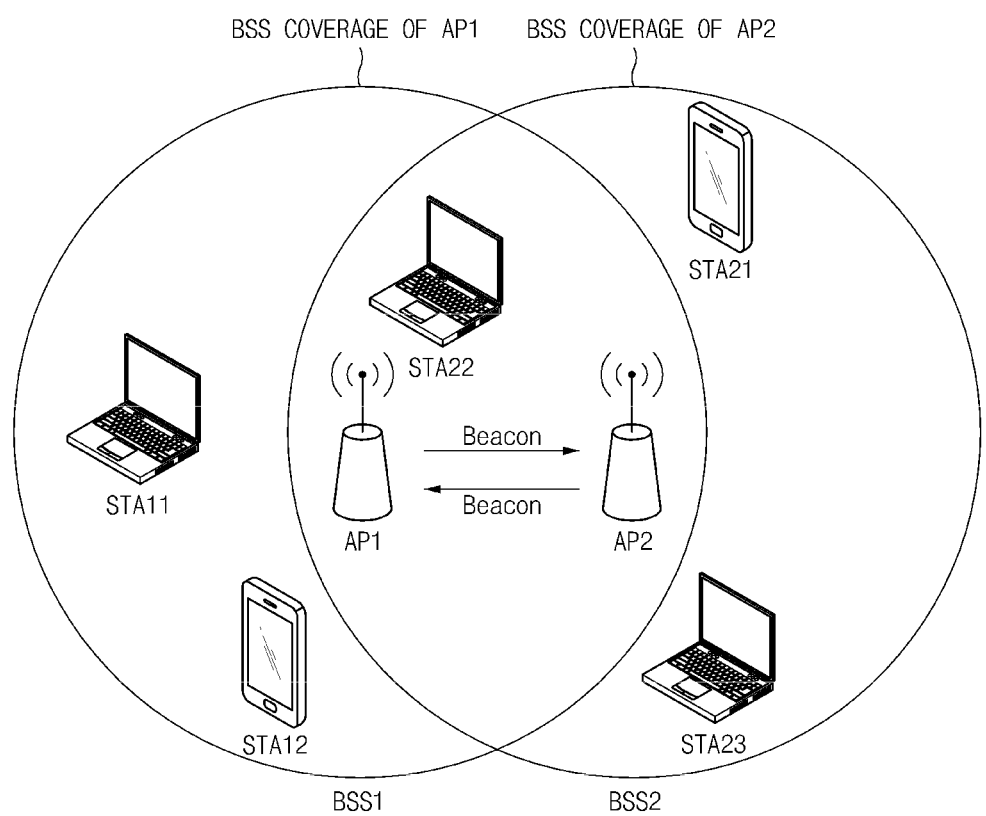
F I G. 1

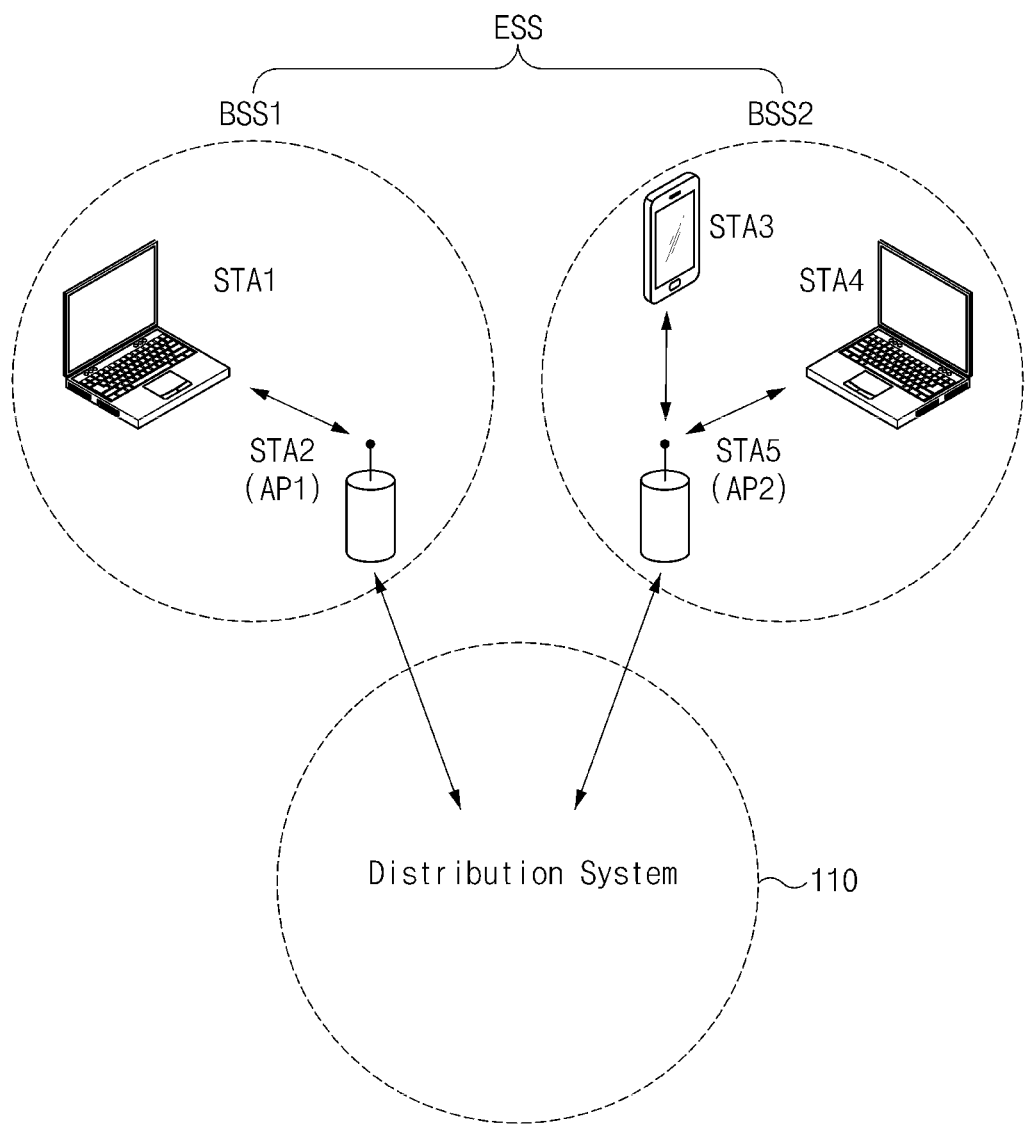
F I G. 3

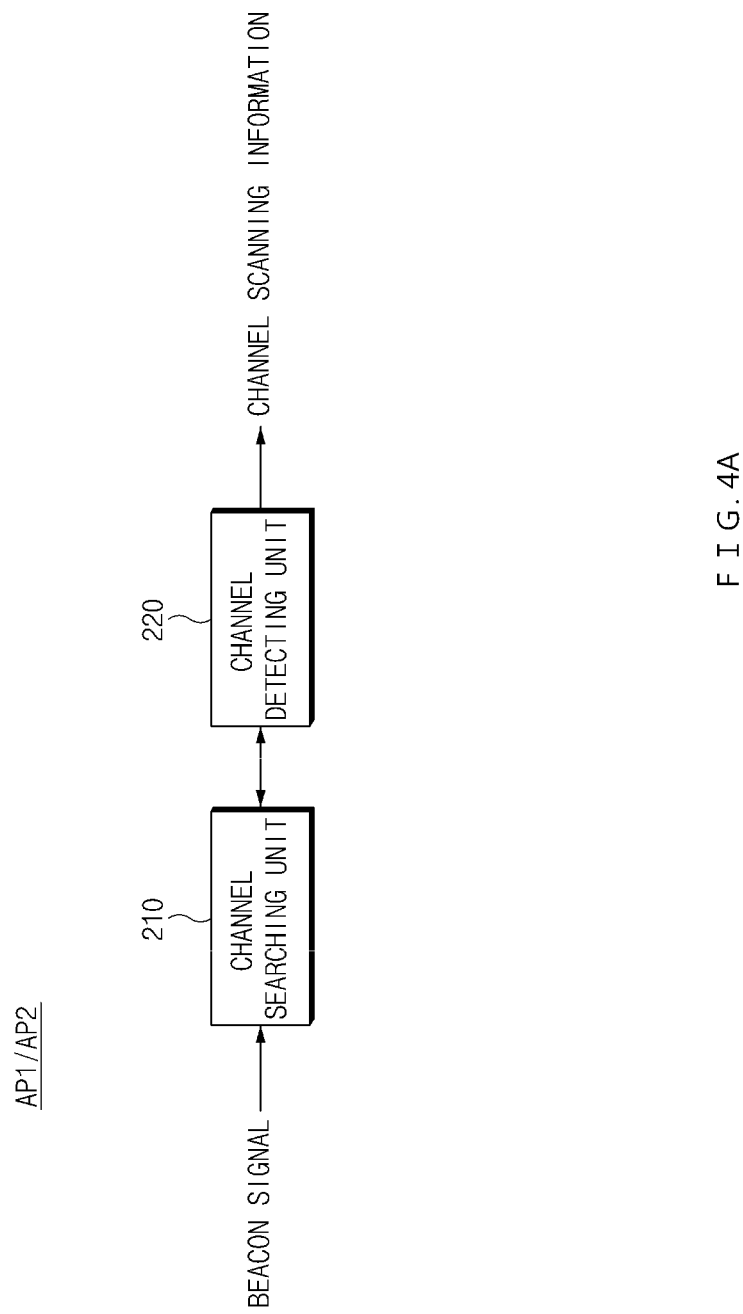
F I G. 4A

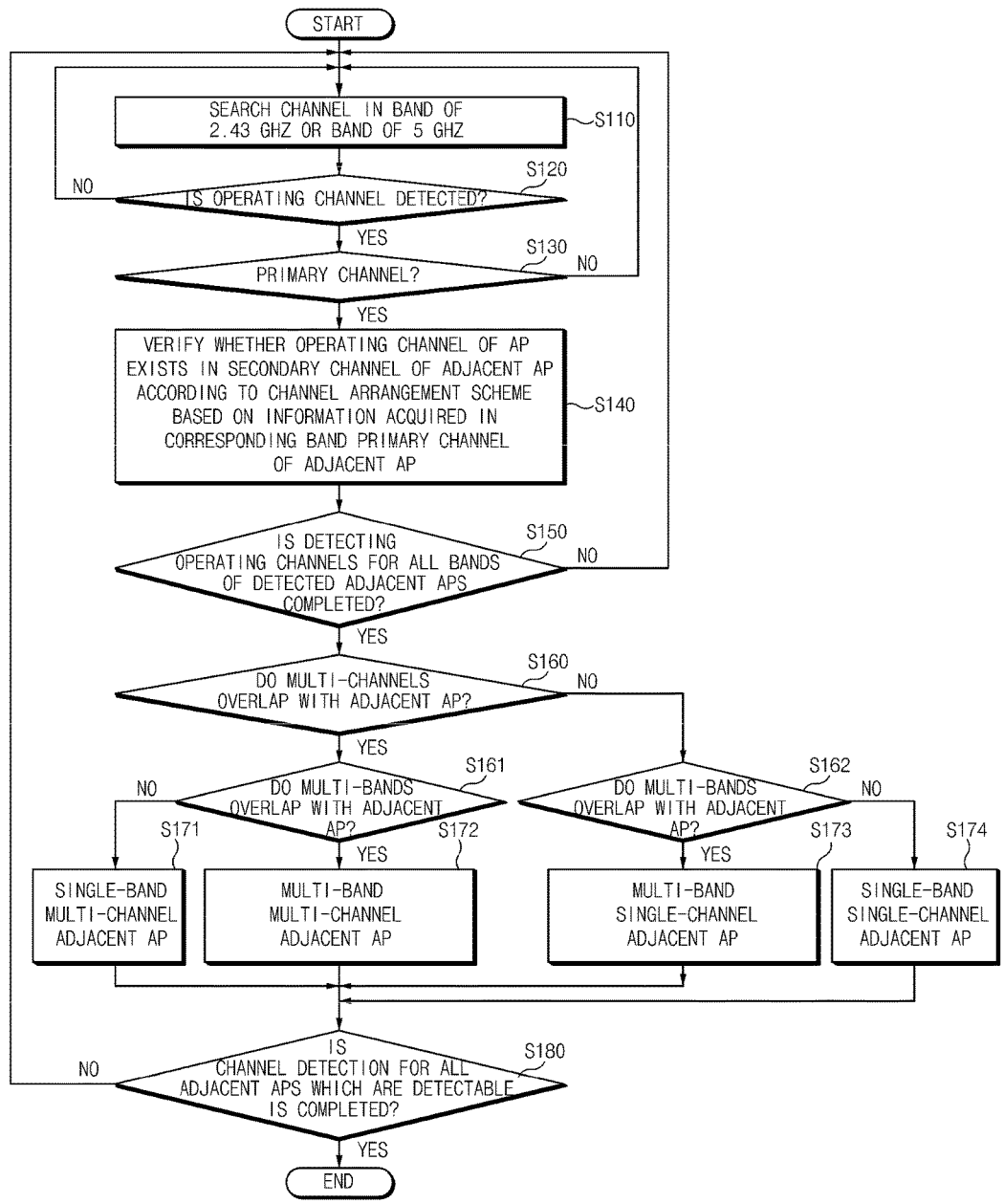
F I G. 4B

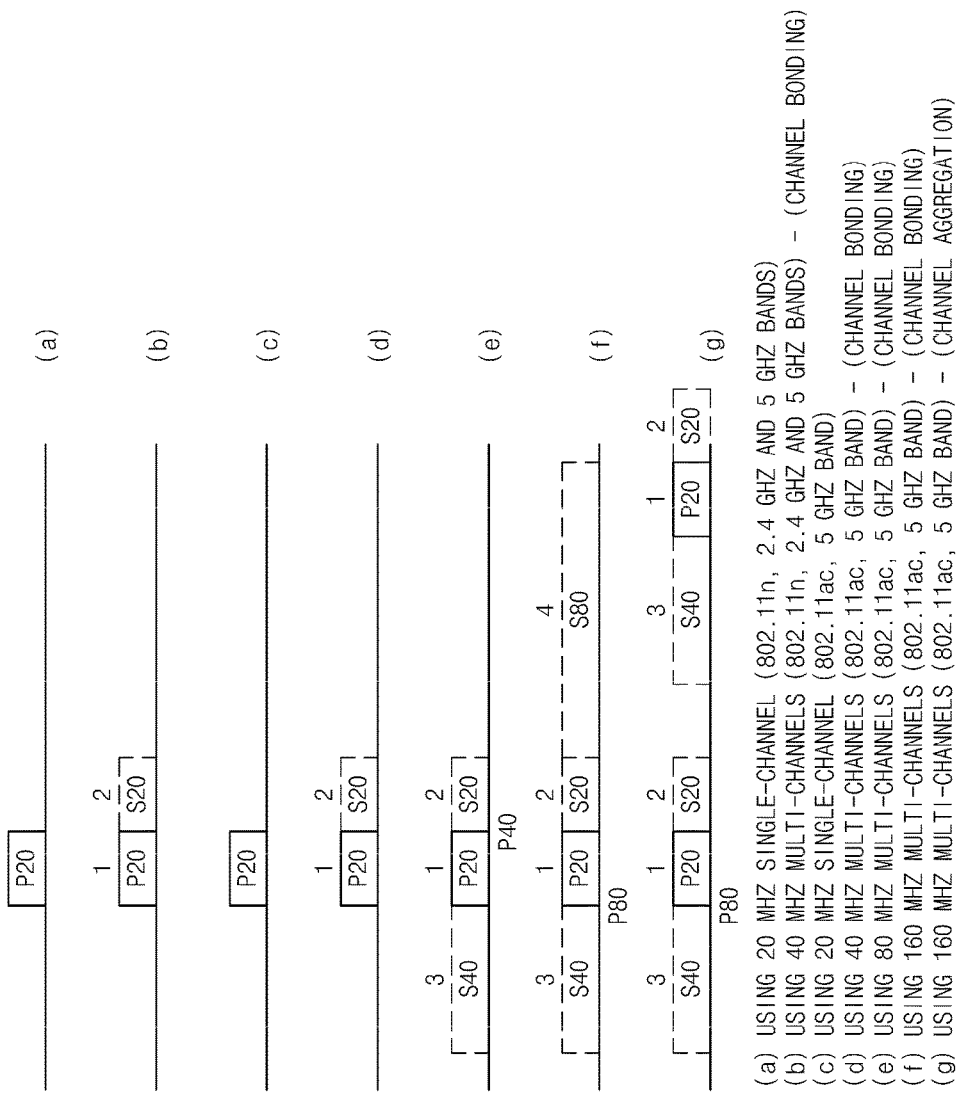

METHOD AND SYSTEM FOR NEIGHBORING ACCESS POINT DISCOVERY BETWEEN MULTI-BAND WIRELESS LAN ACCESS POINTS

TECHNICAL FIELD

The present invention relates to a method and a system for wireless communication in a wireless local area network (WLAN), and particularly, a method and a system for discovering an adjacent access point between access points in a wireless LAN (WLAN) using multi-bands.

BACKGROUND ART

With the development of information communication technology, various wireless communication technologies have been developed. Among them, a WLAN is a technology that enables wirelessly accessing the Internet in households, enterprises, or a specific service providing area by using portable terminals such as a personal digital assistant (PDA), a laptop computer, a portable multimedia player (PMP), a smart phone, a tablet PC, and the like based on wireless frequency technology.

A standard for the WLAN technology has been developed as the Institute of Electrical and Electronics Engineers (IEEE) 802.11 standard. IEEE 802.11a provides a transmission speed of 54 Mbps by using an unlicensed band at 5 GHz. IEEE 802.11b provides a transmission speed of 11 Mbps by applying a direct sequence spread spectrum (DSSS) at 2.4 GHz. IEEE 802.11g provides a transmission speed of 54 Mbps by applying orthogonal frequency division multiplexing (OFDM) at 2.4 GHz. IEEE 802.11n provides a transmission speed of 300 Mbps to four spatial streams by applying multiple input multiple output-OFDM (MIMO-01-DM). The IEEE 802.11n supports a channel bandwidth of up to 40 MHz and in this case, provides a transmission speed of 600 Mbps.

As the supply of the wireless LAN is activated and applications using the wireless LAN are diversified, the need for a new wireless LAN technology for supporting a higher throughput than a data processing speed supported by the IEEE 802.11n has increased. A very high throughput (VHT) wireless LAN technology is one of the IEEE 802.11 wireless LAN technologies proposed in order to support a data processing speed of 1 Gbps or higher. Among them, IEEE 802.11ac is a standard for providing a very high throughput in a band of 6 GHz or less and IEEE 802.11ad is a standard for providing the very high throughput in a 60 GHz band.

Besides, a standard for various wireless LAN technologies is stipulated and the standard is being developed. Representatively, IEEE 802.11af is a standard for operating the wireless LAN in a TV idle band (white space), IEEE 802.11ah is a standard for supporting many terminals that operate at low power, and IEEE 802.11ai is a standard for fast initial link setup (FILS) in a wireless LAN system. In recent years, in a dense environment in which multiple base stations and terminals are present, development of an IEEE 802.11ax standard for improving frequency efficiency is in progress.

Due to an explosive increase of wireless LAN networks having various standards, interference among wireless LAN apparatuses which access different adjacent access points (APs), that is, belong to different basic service sets (BSSs) increases day by day and particularly, in WLAN 802.11ac, as a channel width of 20 MHz/40 MHz/80 MHz/160 MHz and a band of 5 GHz are used which are a wider channel width and a wider frequency band than the 802.11n using bands of 2.4 GHz and 5 GHz and a channel width of 20 MHz/40 MHz, a possibility that channels partially overlapped or completely overlapped between neighboring access points (APs) will be used further increases and the resulting interference problem comes to the fore as an important issue to be solved. Therefore, a scheme for efficient discovery considering a band and a channel width between adjacent APs using multi-bands is particularly required to efficiently use a frequency resource.

In order to minimize interference between the adjacent APs using the multi-bands and efficiently use the frequency resource, it is important for the AP to determine existence of the adjacent APs using the multi-bands which exist in an area to given interference thereto. In the discovery of the adjacent APs using the multi-bands, two following cases may be considered.

FIG. 1 illustrates a case in which AP1 and AP2 have a relationship of adjacent APs in which respective basic service set (BSS) coverage overlaps with each other, and as a result, using the same band and the same operating channel may interfere with both APs and in the BSS coverage of AP1 and AP2, both APs may detect mutual beacon signals. In this case, AP1 and AP2 do not have a hidden AP relationship with each other and a separate method for the adjacent AP discovery is not required. STA11 and STA12 are terminals that access AP1 and STA21, STA22, and STA23 are terminals that access AP2.

Meanwhile, in the case of FIG. 2, in which AP1 and AP2 have a relationship of adjacent APs which may interfere with each other when the respective BSS coverage overlaps with each other use the same operating channel and a partial overlapping operating channel in the same band, but both APs exist outside the respective BSS coverage in which both APs may not detect mutual beacon signals unlike FIG. 1. In this case, since AP1 and AP2 may not determine mutual existence for themselves, AP1 and AP2 have the hidden AP relationship and a method for discovering mutual existence is required to avoid interference between the BSSs of both APs, which occurs when the same and partially overlapped operating channels are used.

DISCLOSURE

Technical Problem

Accordingly, the present invention is contrived to solve the aforementioned problem and an object of the present invention is to provide a method and a system for discovering an adjacent neighboring AP between APs in order to solve an inter-AP interference problem in a wireless LAN using multi-bands.

The technical objects of the present invention are not limited to the aforementioned technical objects, and other technical objects, which are not mentioned above, will be apparently appreciated to a person having ordinary skill in the art from the following description.

Technical Solution

First, when features of the present invention are summarized, in order to achieve the object, an embodiment of the present invention provides a method for discovering adjacent APs in a wireless LAN AP, including: acquiring first channel scanning information by searching operating channels for one or more first adjacent APs in one or more respective access points (APs) distributed on the wireless LAN; collecting second channel scanning information for one or more second adjacent APs acquired by one or more terminals distributed on the wireless LAN in one or more APs; and transmitting a hidden AP existence announcement message including operating channel information for a hidden AP to a specific terminal among one or more terminals by comparing the first channel scanning information and the second channel scanning information in each of one or more APs, in which the operating channel information for the hidden AP is updated to be added to a neighbor AP list in one or more other APs that receive the hidden AP existence announcement message broadcasted by the specific terminal.

The specific terminal may be a terminal that exists in an overlapping area of cell coverage of a plurality of APs and the specific terminal may be a terminal that detects operating channel information for the most APs among a plurality of terminals providing the second channel scanning information.

In the acquiring of the first channel scanning information, with respect to each of the multi-bands, primary channel information may be detected with respect to each first adjacent AP and sub channel information which exists to correspond to a primary channel may be detected according to channel arrangement information, however, and channel detection between adjacent APs in a channel in which a sub channel exists may be preferentially executed in order to more rapidly recognize interference with the adjacent APs. Herein, the primary channel information and the sub channel information may be detected from a beacon signal including channel information for multi-bands from the corresponding adjacent AP, and a discovery of another band may not be separately performed and primary channel information and sub channel information for another band may be detected by using channel information of n (n is a natural number) other bands included in the beacon signal.

The first adjacent AP may be divided into a single-band single-channel adjacent AP, a single-band multi-channel adjacent AP, a multi-band single channel adjacent AP, or a multi-band multi-channel adjacent AP according to whether multi-channels overlap with each other and whether multi-bands overlapping with each other to acquire operating channel information for each divided adjacent AP type as the first channel scanning information.

The acquiring of the first channel scanning information may include determining an order in which a priority increases as the order of the single-band single-channel adjacent AP, the single-band multi-channel adjacent AP, the multi-band single-channel adjacent AP, and the multi-band multi-channel adjacent AP and determining the multi-band multi-channel adjacent AP as a first priority interference avoidance target. In the collecting of the second channel scanning information, with respect to each of the multi-bands, one or more terminals may detect the primary channel information for each second adjacent AP and detect the sub channel information which exists to correspond to the primary channel according to the channel arrangement information to acquire operating channel information including the detected primary channel information and sub channel information as the second channel scanning information.

The method for discovering adjacent APs in a wireless LAN AP may further include: transmitting, according to a response to the specific terminal in an AP that receives the hidden AP existence announcement message, a Confirm message including connection setup information with the hidden AP to the AP to which the specific terminal transmits the hidden AP existence announcement message; and setting up, by the AP that receives the confirm message, connection with the hidden AP through the specific terminal according to the connection setup information with the hidden AP.

In addition, another embodiment of the present invention provides a wireless LAN AP including: a channel searching unit searching operating channels with respect to one or more respective access points (APs) distributed on a wireless LAN; a channel detecting unit acquiring first channel scanning information based on information of the operating channels for one or more first adjacent APs searched by the channel searching unit; a discovery unit collecting second channel scanning information for one or more second adjacent APs acquired by one or more terminals distributed on the wireless LAN and detecting a hidden AP by comparing the first channel scanning information and the second channel scanning information; and a messaging unit transmitting a hidden AP existence announcement message including operating channel information for the hidden AP to a specific terminal among one or more terminals with the detection of the hidden AP, in which the operating channel information for the hidden AP is updated to be added to a neighbor AP list in one or more other APs that receive the hidden AP existence announcement message broadcasted by the specific terminal.

The specific terminal may be a terminal that exists in an overlapping area of cell coverage of a plurality of APs and the specific terminal may be a terminal that detects operating channel information for the most APs among a plurality of terminals providing the second channel scanning information.

With respect to each of the multi-bands, the channel searching unit may detect primary channel information with respect to each first adjacent AP and the channel detecting unit may detect, sub channel information which exists to correspond to a primary channel according to channel arrangement information based on the primary channel information and preferentially execute channel detection between adjacent APs in a channel in which a sub channel exists in order to more rapidly recognize interference with the adjacent APs. Herein, the primary channel information and the sub channel information may be detected from a beacon signal including channel information for multi-bands from the corresponding adjacent AP and a discovery of another band may not be separately performed and primary channel information and sub channel information for the another band may be detected by using channel information of n (n is a natural number) other bands included in the beacon signal.

The channel detecting unit may divide the first adjacent AP into a single-band single-channel adjacent AP, a single-band multi-channel adjacent AP, a multi-band single channel adjacent AP, or a multi-band multi-channel adjacent AP according to whether multi-channels overlapping with each other and whether multi-bands overlapping with each other to acquire operating channel information for each divided adjacent AP type as the first channel scanning information.

The channel detecting unit may determine an order in which a priority increases as the order of the single-band single-channel adjacent AP, the single-band multi-channel adjacent AP, the multi-band single-channel adjacent AP, and the multi-band multi-channel adjacent AP and determine the multi-band multi-channel adjacent AP as a first priority interference avoidance target.

With respect to the respective multi-bands, one or more terminals may detect the primary channel information for each second adjacent AP and detect the sub channel information which exists to correspond to the primary channel according to the channel arrangement information to acquire operating channel information including the detected primary channel information and sub channel information as the second channel scanning information.

The wireless LAN AP may further include a connection setup unit setting up connection with the hidden AP through the specific terminal according to connection setup information with the hidden AP when receiving a confirm message including the connection setup information with the hidden AP from the specific terminal according to a response to the specific terminal in an AP that receives the hidden AP existence announcement message.

Advantageous Effects

According to a method and a system for discovering an adjacent neighboring AP between APs in a wireless LAN using multi-bands according to the present invention, in the case of an AP using the multi-bands, since it is important to set a priority for an AP which needs to preferentially execute channel switching for interference avoidance according to band and channel interference degrees with an adjacent AP, a primary channel of the AP using the multi-bands is preferentially detected and further, channel detection between adjacent APs in a channel in which a sub channel exists is preferentially executed according to a channel arrangement criterion determined in a wireless LAN standard based on channel width information included in the primary channel to more rapidly recognize interference between the adjacent APs depending on use of multi-bands and multi-channels.

Further, in the case of the AP using the multi-bands, when APs discover each other through directly detecting a beacon signal or channel detection using a terminal in a cell coverage overlapping area in one band, a discovery of another band is not separately performed and the discovery of another band is performed based on information obtained in one band to minimize overhead of a channel detection time required for a discovery in the multi-bands, or the like.

DESCRIPTION OF DRAWINGS

FIG. 1 illustrates a case in which adjacent APs may detect mutual beacon signals in a general wireless LAN.

FIG. 3 is a diagram for describing a concept of a wireless LAN system according to an embodiment of the present invention.

FIG. 4A is a block diagram for describing an AP according to an embodiment of the present invention.

FIG. 4B is a flowchart for describing an operation for an adjacent AP discovery in an AP according to an embodiment of the present invention.

FIG. 5 illustrates an example of a wireless LAN channel width and a channel arrangement method according to an embodiment of the present invention.

BEST MODE

Figure 2:
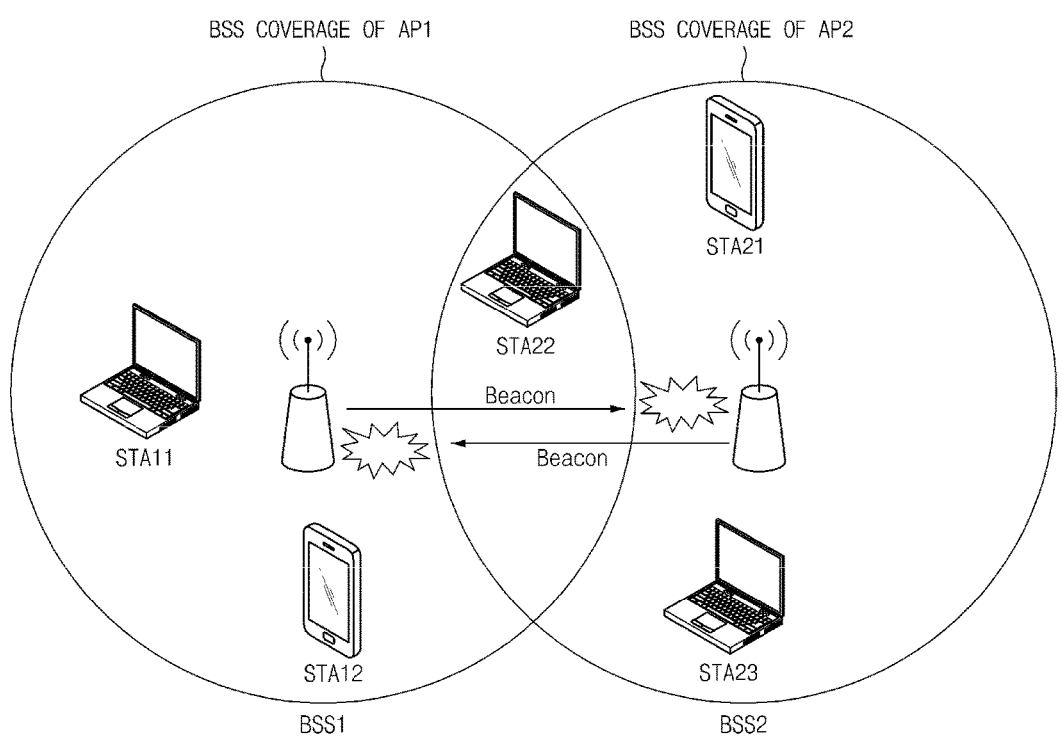
FIG. 2 illustrates a case in which adjacent APs may not detect mutual beacon signals in the general wireless LAN.

The present invention may have various modifications and various embodiments and specific embodiments will be illustrated in the drawings and described in detail. However, this does not limit the present invention to specific embodiments, and it should be understood that the present invention covers all the modifications, equivalents and replacements included within the idea and technical scope of the present invention.

Terms such as first, second, and the like may be used to describe various components and the components should not be limited by the terms. The terms are used only to discriminate one constituent element from another component. For example, a first component may be referred to as a second component, and similarly, a second component may be referred to as a first component without departing from the scope of the present invention. A terminology such as and/or includes a combination of a plurality of associated items or any item of the plurality of associated items. It should be understood that, when it is described that a component is "connected to" or "access" another component, the component may be directly connected to or access the other component or a third component may be present therebetween. In contrast, it should be understood that, when it is described that a component "is directly connected to" or "directly accesses" another component, it should be understood that no component is not present therebetween.

Terms used in the present application are used only to describe specific embodiments, and are not intended to limit the present invention. Singular expressions used herein include plural expressions unless they have definitely opposite meanings in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art, and are not interpreted as an ideal or excessively formal meaning unless clearly defined in the present application.

Hereinafter, preferred embodiments of the present invention will be described in more detail with reference to the accompanying drawings. In describing the present invention, like reference numerals refer to like elements in the drawings for easy overall understanding and a duplicated description of like elements will be omitted.

In the present invention, a station (STA) means a predetermined functional medium including medium access control (MAC) that follows requirements by the Institute of Electrical and Electronics Engineers (IEEE) 802.11 standard and a physical layer interface for a wireless medium. The station (STA) may be divided into a station (STA) which is an access point (AP) and a station (STA) which is a non-AP. The station (STA) which is the access point (AP) may be simply called the access point (AP) and the station (STA) which is the non-AP may be simply called a terminal.

The station (STA) includes a processor and a transceiver and may further include a user interface and a display device. The processor means a unit contrived to generate a frame to be transmitted through a wireless network or process a frame received through the wireless network and performs various functions for controlling the station (STA). The transceiver means a unit which is functionally connected with the processor and is contrived to transmit/receive the frame through the wireless network for the station (STA).

The access point (AP) may refer to a concentration controller, a base station (BS), a radio access station, a node B, an evolved node B, a mobile multihop relay (MMR)-BS, a base transceiver system (BTS), or a site controller or include a part or all of the functions thereof.

The terminal may refer to a wireless transmit/receive unit (WTRU), user equipment (UE), a user terminal (UT), an access terminal (AT), a mobile station (MS), a mobile terminal, a subscriber unit, a subscriber station (SS), a wireless device, or a mobile scriber unit and include a part r all of the functions thereof.

Herein, the terminal may include a desktop computer, a laptop computer, a tablet PC, a wireless phone, a mobile phone, a smart phone, a smart watch, a smart glass, an e-book reader, a portable multimedia player (PMP), a portable game machine, a navigation device, a digital camera, a digital multimedia broadcasting (DMB) player, a digital audio recorder, a digital audio player, a digital picture recorder, a digital picture player, a digital video recorder, a digital video player, and the like which are communicatable.

FIG. 3 is a diagram for describing a concept of a wireless LAN (e.g., IEEE 802.11 wireless LAN) system 100 according to an embodiment of the present invention. Referring to FIG. 3, the wireless LAN system 100 according to the embodiment of the present invention includes at least one basic service set (BSS). The BSS means a set of stations which may communicate with each other through successful synchronization and is not a concept meaning a specific area.

The BSS may be divided into an infrastructure BSS and an independent BSS (IBSS) and in FIG. 3, BSS1 (STA1 and STA2 (AP1)) and BSS2 (STA3, STA4, and STA5 (AP2)) mean the infrastructure BSSs. BSS1 may include a terminal (STA1) the access point (STA2 (AP1)) providing a distribution service and a distribution system (DS) 110 connecting multiple access points (STA2 (AP1) and STA5 (AP2)). In BSS1, the access point (STA2 (AP1)) may manage the terminal (STA1).

BSS2 may include the terminals (STA3 and STA4), the access point (STA5 (AP2)) providing the distribution service, and the distribution system 110 connecting the multiple access points (STA2 (AP1) and STA5 (AP2)). In BSS2, the access point (STA5 (AP2)) may manage the terminals (STA3 and STA4).

Meanwhile, the independent BSS (IBSS) is a BSS that operates in an ad-hoc mode. Since the IBSS does not include the access point, a centralized management entity that performs a management function at the center does not exist. That is, in the IBSS, the terminals are managed in a distributed manner. In the IBSS, all terminals may be constituted by mobile terminals and since all terminals are not allowed to access the distribution system (DS), a self-contained network is established.

The access points (STA2 (AP1) and STA5 (AP2)) may access the distribution system 110 through the wireless medium for the terminals (STA1/STA3 and STA 4) that access the access points (STA2 (AP1) and STA5 (AP2)). In BSS1 or BSS2, the terminals STA1, STA3, and STA4 may generally communicate with each other through the access points STA2 (AP1) and STA5 (AP2), but when a direct link is set, the terminals STA1, STA3, and STA4 may directly communicate with each other.

A plurality of infrastructures BSSs (BSS1 and BSS2) may be connected with each other through the distribution system 100. The plurality of BSSs (BSS1 and BSS2) connected through the distribution system 110 is referred to as an extended service set (ESS). Stations included in the ESS may communicate with each other and in the same ESS, the terminal may move from one BSS to another BSS while allowing seamless communication.

The distribution system 110 is a mechanism for one access point AP1 to communicate with the other access point AP2 and according to the mechanism, the access points AP1 and AP2 may transmit the frame for the terminals coupled to the BSS managed thereby or transmit the frame for a predetermined terminal that moves to the other BSS. Further, the access points AP1 and AP2 may transmit/receive the frame to/from an external network such as a wired network, or the like. The distribution system 110 need not particularly be a network and there is no limit in type of the distribution system 110 if the distribution system may provide a predetermined distribution service stipulated in an IEEE 802.11 standard. For example, the distribution system 110 may be a wireless network such as a mesh network or a physical structure connecting the access points AP1 and AP2 with each other.

A method and an apparatus according to embodiments of the present invention to be described below may be applied to the IEEE 802.11 wireless LAN system described above and moreover, applied to various networks including portable Internet such as a wireless personal area network (WPAN), a wireless body area network (WBAN), a wireless broadband internet (WiBro), or world interoperability for microwave access (WiMax), a 2G mobile communication network such as global system for mobile communication (GSM) or code division multiple access (CDMA), a 3G mobile communication network such as wideband code division multiple access (WCDMA) or cdma2000, a 3.5G mobile communication network such as high speed downlink packet access (HSDPA) or high speed uplink packet access (HSUPA), a 4G mobile communication network such as long term evolution (LTE) or LTE-Advanced, a 5G mobile communication network, and the like.

Meanwhile, in the wireless LAN, the frame is largely classified into a data frame, a management frame, and a control frame. The data frame includes data to be transmitted to the terminals STA1, STA3, and STA4 and is transmitted from an upper layer to the terminals. The management frame is used for management supporting an IEEE 802.11 service. The control frame is used for control supporting transmission of the data frame and the management frame.

The management frame may include an association request frame, an association response frame, a reassociation request frame, a reassociation response frame, a probe request frame, a probe response frame, a beacon frame, an authentication frame, an action frame, and the like.

The control frame may include a block acknowledgement (ACK) request frame, a block ACK frame, a power-save (PS)-poll frame, a request to send (RTS) frame, a clear to send (CTS) frame, an ACK frame, a contention free (CF)-end frame, and the like.

In an adjacent AP discovery scheme among wireless LAN APs (AP1 and AP2) using multi-bands (e.g., 2G, 3G, 3.5 G, 4G, 5G, and the like) proposed in the present invention, adjacent AP detection is preferentially executed in a channel in which a sub channel exists based on a channel width extension scheme by channel (width) information and a wireless LAN standard included in a primary channel when the multi-bands are used in each AP and terminal to enable an inter-adjacent AP discovery using the multi-bands to be effectively performed. Further, proposed is a method in which when the APs using the multi-bands discover each other through direct discovery using a beacon signal or channel detection using an STA positioned in an overlapping area in one band, a discovery of another band is not separately performed and the discovery of another band is performed based on information obtained in one band to minimize overhead of a channel detection time required for a discovery in the multi-bands, or the like.

In the present invention, the adjacent APs are classified into the following four types and when an interference situation occurs, a priority of a target to be preferentially avoided may be determined.

Single-band single-channel adjacent AP (e.g., priority 4)
Single-band multi-channel adjacent AP (e.g., priority 3)
Multi-band single-channel adjacent AP (e.g., priority 2)
Multi-band multi-channel adjacent AP (e.g., priority 1)

Intuitionally, the adjacent AP using the multi-bands and the multi-channels has the highest priority in the interference avoidance and the adjacent AP using the single-band and the single-channel has the lowest priority.

FIG. 4A is a block diagram for describing an AP (AP1/AP2) according to an embodiment of the present invention. Referring to FIG. 4A, the AP (AP1/AP2) according to the embodiment of the present invention includes a channel searching unit 210 and a channel detecting unit 220. Operations thereof will be described with reference to a flowchart of FIG. 4B.

FIG. 4B is a flowchart for describing an operation for an adjacent AP discovery in an AP (AP1/AP2) according to an embodiment of the present invention.

Referring to FIG. 4B, the AP (AP1/AP2) according to the embodiment of the present invention may perform the adjacent AP discovery as described below by considering the multi-bands and the channel width. Herein, a scheme that directly discovers the adjacent AP by using mutual beacon signals which may be detected between the adjacent APs in one band will be described.

First, the channel searching unit 210 searches the channel in a band of 2.4 GHz (IEEE 802.11n, and the like) or 5 GHz (IEEE 802.11ac, and the like) with respect to the adjacent AP based on the beacon signals from one or more adjacent APs (S110) and when an operating channel is detected (S120), it is determined whether the detected operating channel is the primary channel (S130).

Further, the channel detecting unit 220 acquires channel information regarding the primary channel, verifies whether the AP operating channel exists in the sub channel corresponding to the primary channel according to channel arrangement information (see primary channel/sub channel information of FIG. 5) based on the acquired channel information, and acquires information on the corresponding operating channel which exists in the sub channel of the corresponding adjacent AP to store and manage the operating channel information including the acquired primary channel and sub channel information in a storage means (S140). Channel detection between adjacent APs is preferentially executed in a channel in which the sub channel exists as compared with a channel in which the sub channel does not exist according to a channel arrangement criterion determined in the wireless LAN standard based on channel width information included in the primary channel to more rapidly recognize the interference between the adjacent APs depending on use of the multi-bands and the multi-channels and reflect the recognized interference to the determination of the interference avoidance in real time whenever the interference is recognized.

The operating channel detecting process (S110 to S140) for the adjacent AP is repeated until the operating channel information is acquired with respect to all bands and all channels of the adjacent AP (S150).

Further, when acquiring the operating channel information (primary channel and sub channel information) for all bands of the adjacent AP which is detected, is completed, the channel detecting unit 220 divides the adjacent APs into four adjacent AP types of a single-band single-channel adjacent AP (S174), a single-band multi-channel adjacent AP (S171), a multi-band single-channel adjacent AP (S173), and a multi-band multi-channel adjacent AP (S172) according to whether multi-channels overlap with the adjacent AP (S160) and whether multi-channels overlap with the adjacent AP (S161 and S162) to store and manage the four adjacent AP types in the storage means.

When a channel scanning process (S110 to S174) for the adjacent AP is completed as described above, the channel scanning process (S110 to S174) is repeated with respect to all other adjacent APs which are detectable to acquire channel scanning information (S180).

The channel detecting unit 220 may store and manage the operating channel information (primary channel and sub channel information) for each adjacent AP type which is divided according to whether multi-channels overlap with those of the adjacent AP (S160) and whether multi-bands overlap with those of the adjacent AP (S161 and S162) in the storage means as the channel scanning information.

Further, the channel detecting unit 220 may determine the order in which the priority increases as the order of the single-band single-channel adjacent AP (S174), the single-band multi-channel adjacent AP (S171), the multi-band single-channel adjacent AP (S173), and the multi-band multi-channel adjacent AP (S172) and determine the multi-band multi-channel adjacent AP (S172) as a first priority interference avoidance target when the interference situation occurs with respect to the respective detected adjacent APs.

FIG. 5 illustrates an example of a wireless LAN channel width and a channel arrangement method according to an embodiment of the present invention.

In the present invention, the AP/STA may use a primary channel having a predetermine channel width of each band (2.4 GHz and 5 GHz) and one or more sub channels adjacent to the primary channel based on the channel width extension scheme by the wireless LAN standard. The primary channel and sub channel information may be managed and used in a predetermined look-up table form.

For example, as illustrated in FIG. 5, a single channel (P20) at 20 MHz or the sub channel such as multi-channels (channel bonding scheme, P20 and S20) at 40 MHz may be used in the bands of 2.4 GHz and 5 GHz like a case of 802.11n. Herein, P means the primary channel and S means the sub channel.

Further, like a case of 802.11ac, in the band of 5 GHz sub channels such as the single channel (P20) at 20 MHz or multi-channels (channel junction scheme, P20 and S20) at 40 MHz, multi-channels (channel junction scheme, S40, P20, and S20) at 80 MHz, multi-channels (channel junction scheme, S40, P20, S20, and S80) at 160 MHz, multi-channels (channel aggregation scheme, S40, P20, S20, S40, P20, and S20) at 160 MHz, and the like may be used.

Figure 6A:
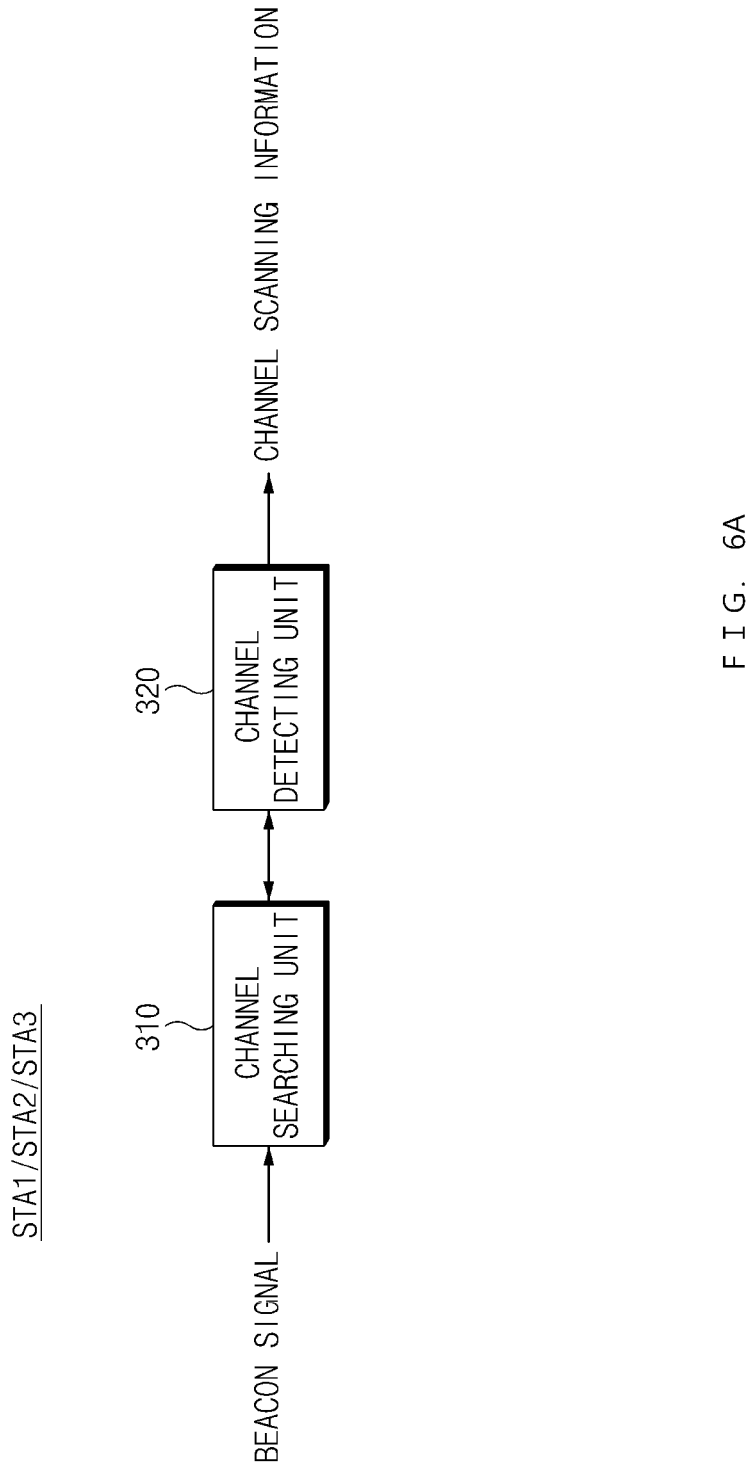
FIG. 6A is a block diagram for describing a terminal according to an embodiment of the present invention.

FIG. 6A is a block diagram for describing a terminal (STA1/STA3/STA4) according to an embodiment of the present invention. Referring to FIG. 6A, the terminal (STA1/STA3/STA4) according to the embodiment of the present invention may include a channel searching unit 310 and a channel detecting unit 320. Operations thereof will be described with reference to a flowchart of FIG. 6B.

Figure 6B:
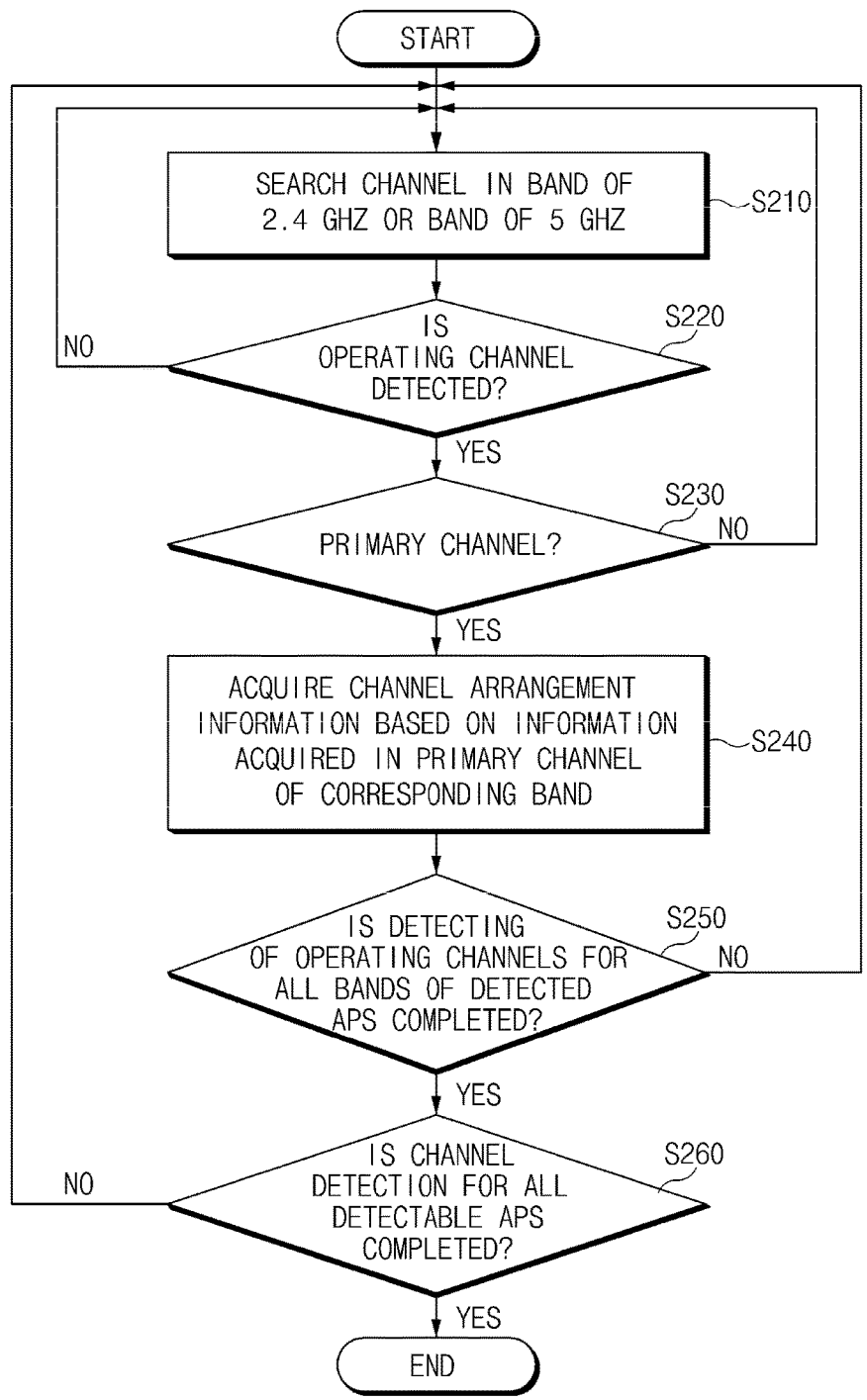
FIG. 6B is a flowchart for describing an operation for an adjacent AP discovery in a terminal according to an embodiment of the present invention.

FIG. 6B is a flowchart for describing an operation for an adjacent AP discovery in a terminal (STA1/STA3/STA4) according to an embodiment of the present invention.

Referring to FIG. 6B, the terminal (STA1/STA3/STA4) according to the embodiment of the present invention may perform the adjacent AP discovery as described below by considering the multi-bands and the channel width.

Herein, an operating method for the adjacent AP discovery using the multi-bands by the terminal STA1/STA3/STA4 positioned in an overlapping area of cell coverage (alternatively, cell coverage of the BSSs) of the APs when the adjacent APs may not detect the mutual beacon signals will be described.

First, the channel searching unit 310 searches the channel in the band of 2.4 GHz (IEEE 802.11n, and the like) or 5 GHz (IEEE 802.11ac, and the like) with respect to the adjacent AP based on the beacon signals from one or more adjacent APs (S210) and when the operating channel is detected (S220), it is determined whether the detected operating channel is the primary channel (S230).

Further, the channel detecting unit 320 acquires channel information regarding the primary channel, verifies whether the AP operating channel exists in the sub channel corresponding to the primary channel according to channel arrangement information (see primary channel/sub channel information of FIG. 5) based on the acquired channel information, and acquires information on the corresponding operating channel which exists in the sub channel to store and manage the operating channel information including the primary channel and sub channel information acquired with respect to the corresponding adjacent AP in the storage means (S240).

The operating channel detecting process (S210 to S240) for the adjacent AP is repeated until the operating channel information is acquired with respect to all bands and all channels of the adjacent AP (S250).

When a channel scanning process (S210 to S250) for the adjacent AP is completed as described above, the channel scanning process (S210 to S250) is repeated with respect to all other adjacent APs which are detectable to acquire the channel scanning information (S260).

The channel detecting unit 220 may store and manage the operating channel information of the adjacent APs in which the operating channels are detected in the storage means as the channel scanning information.

Figure 7A:
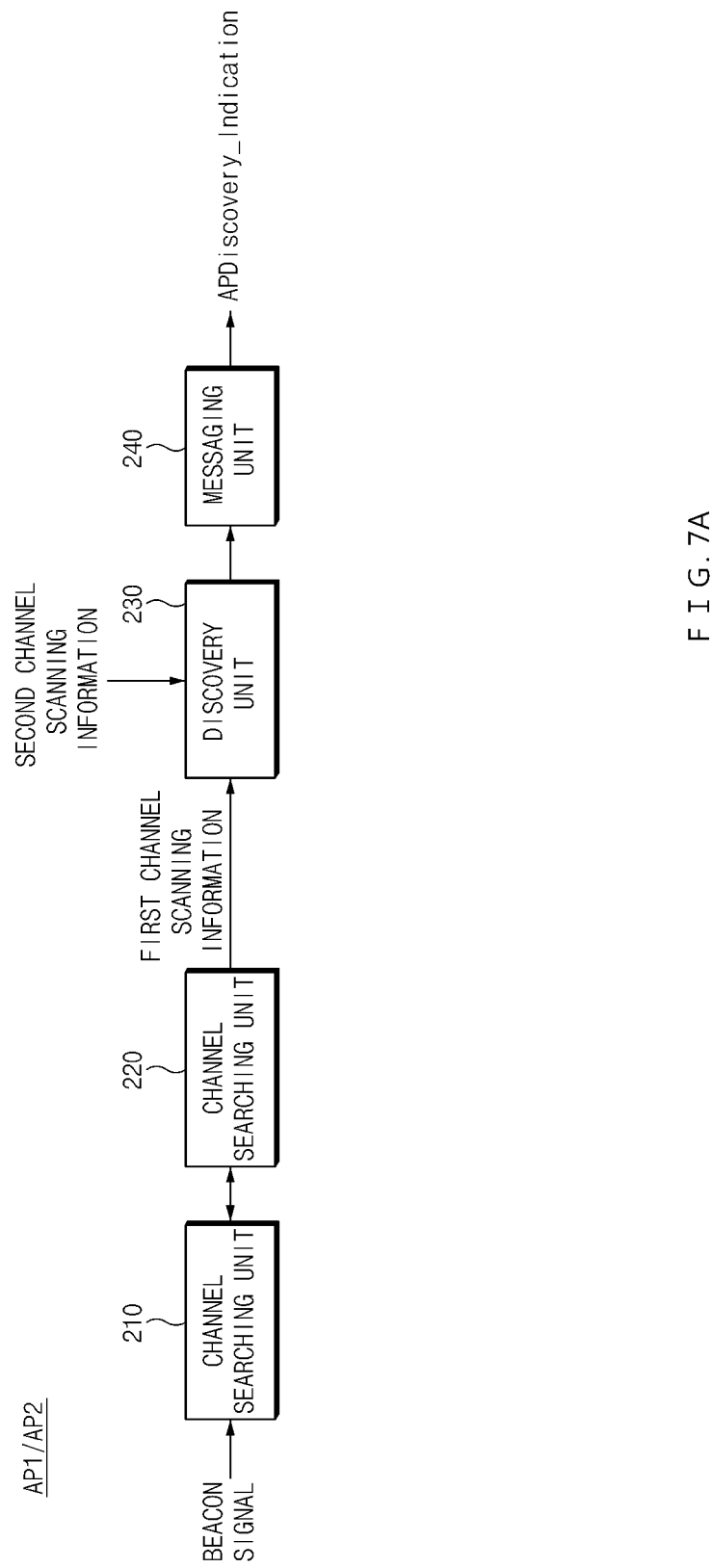
FIG. 7A is a block diagram for additionally describing the AP according to an embodiment of the present invention.

FIG. 7A is a block diagram for additionally describing an AP (AP1/AP2) according to an embodiment of the present invention. Referring to FIG. 7A, the AP (AP1/AP2) according to the embodiment of the present invention includes the channel searching unit 210 and the channel detecting unit 220 as illustrated FIG. 4A and may further include a discovery unit 230 and a messaging unit 240. Operations thereof will be described with reference to a flowchart of FIG. 7B.

Figure 7B:
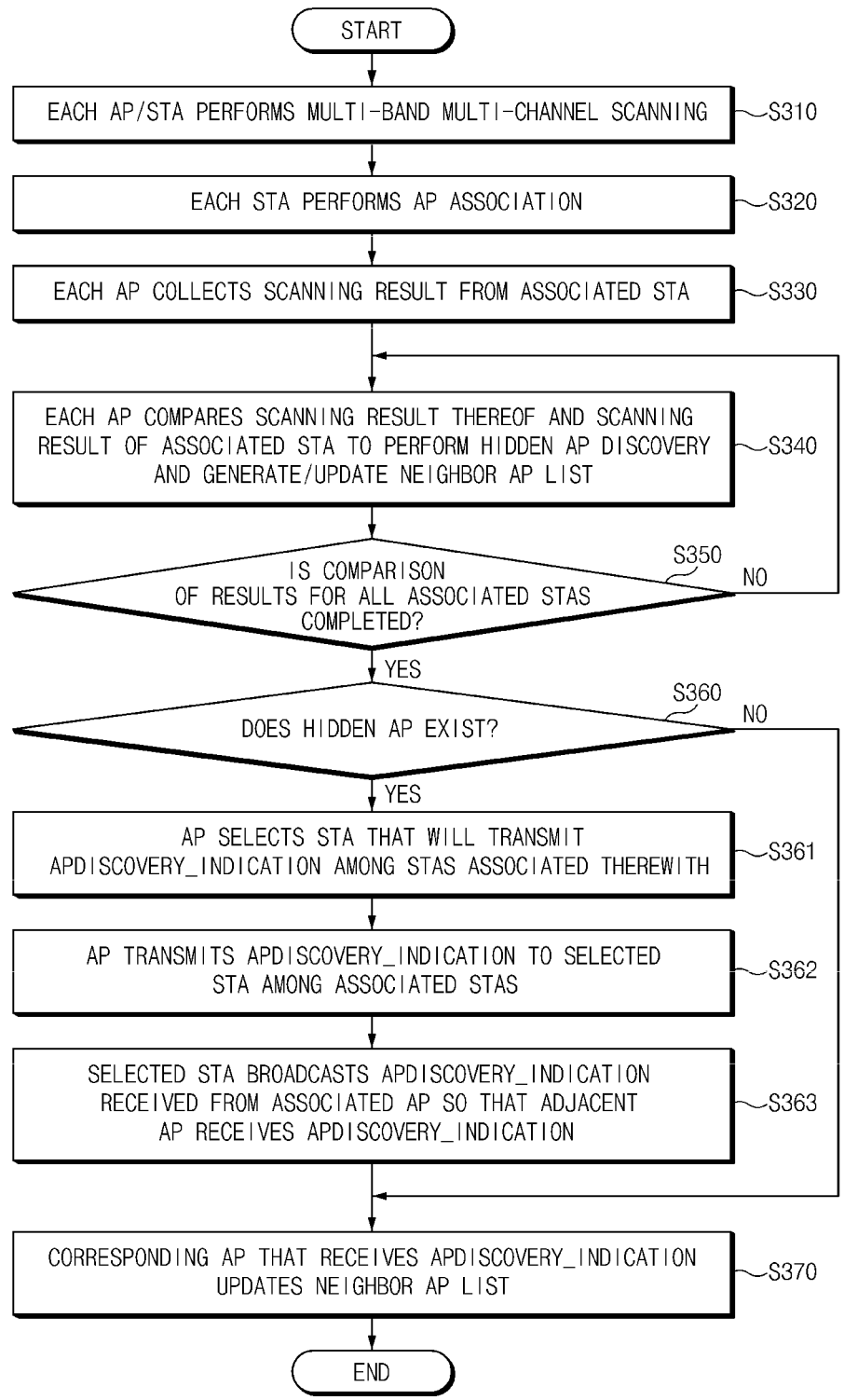
FIG. 7B is a flowchart for describing an operation for an adjacent AP discovery using a terminal positioned in an overlapping area in an AP according to an embodiment of the present invention.

FIG. 7B is a flowchart for describing an operation for an adjacent AP discovery using a terminal positioned in an overlapping area in an AP (see AP1/AP2/AP3 of FIG. 8) according to an embodiment of the present invention.

Referring to FIG. 7B, the AP(s) (AP1/AP2/A3) according to the embodiment of the present invention may perform the adjacent AP discovery as described below by considering the multi-bands and the channel width.

Herein, an operating method of the AP for the adjacent AP discovery using the multi-bands by using the channel scanning information acquired by the terminals (e.g., see STA31 between BSS1 and BSS2 of FIG. 8 and STA32 between BSS2 and BSS3 of FIG. 8) positioned in the overlapping area of the cell coverage (alternatively, cell coverage of the BSSs) of the APs when the adjacent APs cannot detect the mutual beacon signals will be described.

First, the AP(s) (AP1/AP2/A3) and the terminal(s) (e.g., STA11/STA21/STA31/STA32/STA33 of FIG. 8) distributed in a space scan the multi-bands and the multi-channels (S310). As illustrated in FIG. 4B, the AP(s) (AP1/AP2/AP3) perform the channel scanning process (S110 to S180) to acquire first channel scanning information including the operating channel information (primary channel and sub channel information) for each adjacent AP type and the terminal(s) (e.g., STA11/STA21/STA31/STA32/STA33 of FIG. 8) performs the channel scanning process (S210 to S260) to acquire second channel scanning information including the operating channel information with respect to the adjacent AP(s).

Next, each terminal (e.g., STA11/STA21/STA31/STA32/STA33 of FIG. 8) performs association (access) for receiving a service by the AP of the corresponding cell coverage (S320).

Next, the discovery unit 230 of the respective AP(s) (AP1/AP2/A3) collects a scanning result (second channel scanning information) from each of the terminals (e.g., STA11/STA21/STA31/STA32/STA33 of FIG. 8) which are associated (S330). Herein, the discovery unit 230 transmits a Measurement_Request message, and as a result, each STA may collect a channel scanning result acquired through multi-band multi-channel scanning through a Measurement_Response message (see FIG. 9).

Next, the discovery unit 230 of each AP(s) (AP1/AP2/A3) verifies existence of the adjacent AP and an adjacent hidden AP by comparing the first channel scanning information thereof and the collected second channel scanning information to prepare or update a neighbor AP list so as to add an AP (operating channel information for each adjacent AP type) which does not exist in the first channel scanning information) (S340).

In a situation in which the terminals (e.g., STA11/STA21/STA31/STA32/STA33 of FIG. 8) which are associated with the AP(s) (AP1/AP2/A3) are spatially distributed, the update process (340) is repeated until the update process (S340) is achieved with respect to all respective associated terminals (e.g., STA11/STA21/STA31/STA32/STA33 of FIG. 8) (S350).

The discovery unit 230 of the corresponding AP may select one or more specific terminals among terminals associated therewith when the hidden AP exists (S360) (S361). Herein, in selecting the specific terminal, it is preferable to select a terminal that detects the operating channel information for the AP most frequently by performing scanning, that is, the terminal (e.g., STA31) positioned in the overlapping area of the cell coverage of the most APs among the associated terminals (e.g., STA11/STA21/STA31/STA32/STA33 of FIG. 8). As a result, the messaging unit 240 may transmit a hidden AP existence announcement message (APDiscovery_Indication) to the corresponding specific terminal (S362). The APDiscovery_Indication message may include the primary channel and sub channel information of the corresponding hidden AP.

A predetermined means (e.g., broadcasting unit) of the terminal that receives the APDiscovery_Indication message broadcasts the received message so that neighboring AP(s) receives the received message (S363).

The discovery unit 230 of the neighboring AP(s) that receives the broadcasted APDiscovery_Indication message verifies existence of the adjacent AP and the adjacent hidden AP by comparing the first channel scanning information thereof and the collected second channel scanning information to prepare or update the neighbor AP list so as to add the AP (operating channel information for each adjacent AP type) which does not exist in the first channel scanning information) (S370).

When the channel scanning information in each AP and terminal is updated, other AP(s) and terminal(s) repeatedly perform such a process (S310 to S370) to share the channel scanning information with each other.

Figure 8:
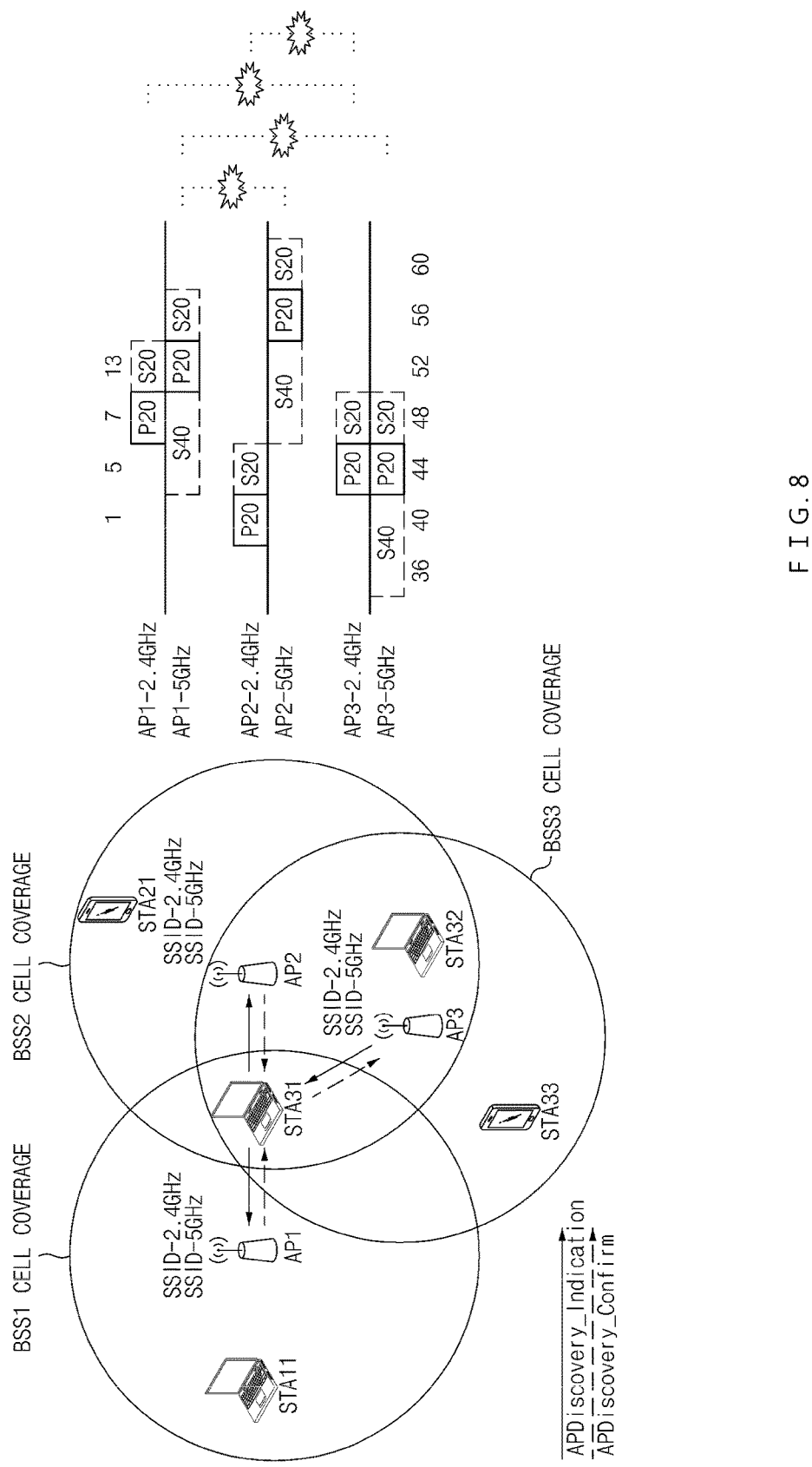
FIG. 8 illustrates an example of a discovery between adjacent APs using multi-bands according to the present invention.

FIG. 8 illustrates an example of a discovery between adjacent APs using multi-bands according to the present invention.

As illustrated in FIG. 8, in respect to AP1, AP2, and AP3 using channels #1, 5, 7, and 13 in the band of 2.4 GHz and channels #36, 40, 44, 48, 52, 56, and 60 in the band of 5 GHz, as a result of the channel scanning in each AP and terminal STA, the channel scanning information may be acquired as shown in [Table 1] given below according to the cell coverage of each AP.

TABLE 1

| AP1 | No AP detected |
|---|---|
| AP2 | Detecting AP3 |
| | Detecting channels #5 and #7 in 2.4 GHz band and channels #36, #40, #44, and #48 in 5 GHz band |
| | Adjacent AP type uses multi-bands and single channel (no multi-channel overlapping) |
| AP3 | Detecting AP2 |
| | Detecting channels #1 and #5 in 2.4 GHz band and channels #48, #52, #56, and #60 in 5 GHz band |
| | Adjacent AP type uses multi-bands and single channel (no multi-channel overlapping) |
| STA11 | Detecting AP1 |
| STA21 | Detecting AP2 |
| STA31 | Detecting AP1, AP2, and AP3 |
| STA32 | Detecting AP2 and AP3 |
| STA33 | Detecting AP3 |

In FIG. 8, since AP1 and AP2 and AP1 and AP3 mutually exist outside the cell coverage area, AP1 and AP2 and AP1 and AP3 may not mutually receive the beacon signals, and as a result, since AP1 and AP2 and AP1 and AP3 may not discover each other through channel scanning, AP1 and AP2 and AP1 and AP3 have a relationship of hidden APs adjacent to each other. Since AP2 and AP3 mutually exist in the cell coverage area, AP2 and AP3 may mutually receive the beacon signals and since AP2 and AP3 may discover mutual existence through the channel scanning, AP2 and AP3 have the relationship of the adjacent APs.

Each AP compares the channel scanning information from the terminal STA associated therewith and the channel scanning information thereof to know the existence of the adjacent hidden APs (see S340 of FIG. 7B). In FIG. 8, AP1 and AP2 have no adjacent hidden AP which may be determined through the channel scanning information from STA11 and STA21. In FIG. 8, since both STA31 that exists in the cell coverage overlapping area of AP1, AP2, and AP3 and STA32 that exists in the cell coverage overlapping area of AP2 and AP3 are associated with AP3, AP3 may determine that AP1 is the adjacent hidden AP based on the channel scanning information of STA31 among the channel scanning information from STA31, STA32, and STA33.

Therefore, AP3 transmits the APDiscovery_Indication message to STA31 so as to broadcast the channel scanning information to the adjacent AP and STA 31 that receives the message broadcasts the APDiscovery_Indication message by using an operating channel used by the adjacent AP. AP1 and AP2 which are the adjacent APs of STA31 receive the message, and as a result, AP1 may discover the existence of AP2 and AP3 and AP2 may discover the existence of AP1.

AP1 and AP2 that receive the APDiscovery_Indication message broadcast a confirm message to make a response. The confirm message may include information required for connection setup with the APs and operating channel information used by the corresponding AP in addition to a function of acknowledgement. STA31 that receives the messages transmits the Confirm message to AP3. AP1 and AP2 may transmit the Confirm message through the beacon signal.

As necessary, the Confirm message may be omitted. However, when the Confirm message is received, a predetermined means (e.g., connection setup unit) of each AP receives information required for connection setup with the hidden AP and the operating channel information used by the hidden AP, and the like to perform the connection setup with the hidden AP depending on a relay of STA31 of the overlapping area by using the information.

Based on information exchange between the hidden APs (e.g., AP1 and AP2 and AP1 and AP3) based on the channel scanning information of STA31, AP1, AP2, and AP3 may complete the adjacent AP discovery as shown in [Table 2] given below in FIG. 8.

TABLE 2

| AP1 | Detecting AP2 (channels #1 and #5 in 2.4 GHz band and channels #48, #52, #56, and #60 in 5 GHz band, adjacent AP using single band and multi-channels) |
|---|---|
| | Detecting AP3 (channels #5 and #7 in 2.4 GHz band and channels #36, #40, #44, and #48 in 5 GHz band, adjacent AP using multi-bands and multi-channels) |
| AP2 | Detecting AP1 (channels #7 and #13 in 2.4 GHz band and channels #44, #48, #52, and #56 in 5 GHz band, adjacent AP using single band and multi-channels) |
| | Detecting AP3 (channels #5 and #7 in 2.4 GHz band and channels #36, #40, #44, and #48 in 5 GHz band, adjacent AP using multi-bands and single channel) |
| AP3 | Detecting AP1 (channels #7 and #13 in 2.4 GHz band and channels #44, #48, #52, and #56 in 5 GHz band, adjacent AP using multi-bands and multi-channels) |
| | Detecting AP2 (channels #1 and #5 in 2.4 GHz band and channels #48, #52, #56, and #60 in 5 GHz band, adjacent AP using multi-bands and single channel) |

Figure 9:
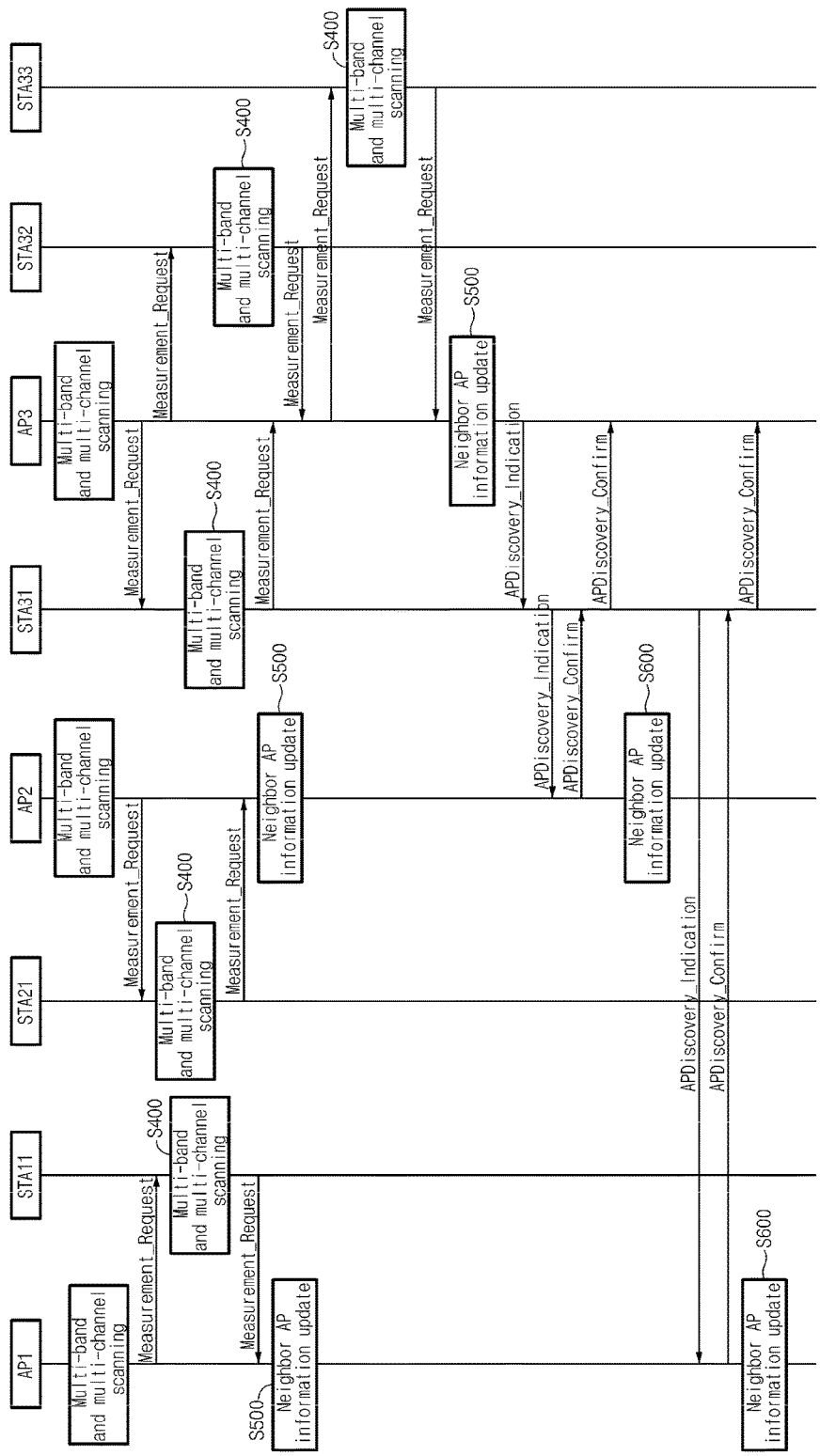
FIG. 9 illustrates a message exchange scheme between an AP and an STA for a discovery between adjacent APs using multi-bands according to the present invention.

FIG. 9 illustrates a message exchange scheme between an AP and a terminal for a discovery between adjacent APs using multi-bands according to the present invention.

Referring to FIG. 9, each AP (AP1/AP2/AP3) autonomously performs multi-band multi-channel scanning and transmits the Measurement_Request message to the terminals STA11/STA21/STA31/STA32/STA33 associated therewith, and as a result, each STA acquires the channel scanning information acquired through the multi-band multi-channel scanning through the Measurement_Request message. In this case, each STA that receives the Measurement_Request message from the associated AP acquires channel scanning information (S400) for the AP using the multi-bands and multi-channels by using preferentially the primary channel information used by each AP and transmits the result to the associated AP according to the STA operating method for discovering the adjacent AP using the multi-bands as described in FIG. 6B.

As a result, each AP updates the neighbor AP list so as to add an AP (operating channel information for each adjacent AP type) which does not exist in the channel scanning information thereof (S500). Thereafter, for example, in FIG. 9, AP3 transmits to STA31 the APDiscovery_Indication message including the operating channel information (channel scanning information) of the hidden AP and STA31 broadcasts the APDiscovery_Indication message by using the operating channel used by the adjacent AP (e.g., AP1 and AP2).

The adjacent AP (e.g., AP1 and AP2) that receives the broadcasted APDiscovery_Indication message verifies the existence of the adjacent AP and the adjacent hidden AP by comparing the channel scanning information thereof and the collected channel scanning information to prepare or update the neighbor AP list so as to add the AP (operating channel information for each adjacent AP type) which does not exist in the channel scanning information) (S600) and broadcasts the Confirm message to make a response. STA31 that receives the messages transmits the Confirm message to AP3.

Figure 10:
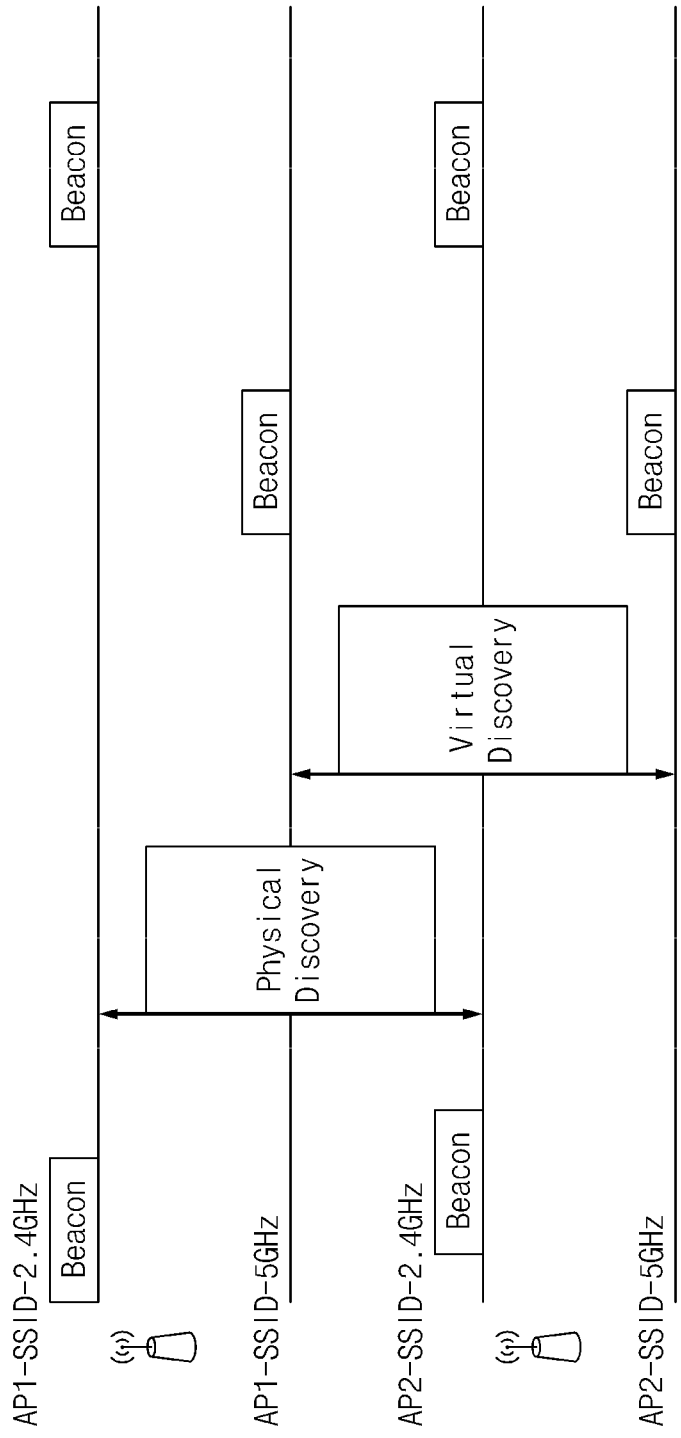
FIG. 10 illustrates an example of a multi-band discovery using one band between adjacent APs using multi-bands according to the present invention.

FIG. 10 illustrates an example of a multi-band discovery using one band between adjacent APs using multi-bands according to the present invention.

According to the present invention, in the case of the AP (STA) using the multi-bands, when APs discover each other through directly using the beacon signal or channel detection using the STA in the cell coverage overlapping area in one band, a discovery of another band is not separately performed and the discovery of another band is performed based on information obtained in one band to minimize overhead of a channel detection time required for a discovery in the multi-bands, or the like. To this end, the AP using the multi-bands may transmit the beacon signal including information (e.g., channel information including the primary channel information for the band of 5 GHz, and the like) of one or more (e.g., n (n is a natural number)) other bands together with the information (e.g., channel information for the band of 2.4 GHz) of the corresponding band.

In FIG. 10, when AP1 and AP2 using service set ID (SSID) 2.4 GHz and 5 GHz bands transmit all information of both bands through the beacon signals in the bands of 2.4 GHz and 5 GHz, a discovery (physical discovery) between AP1 and AP2 is performed in the band of 2.4 GHz and thereafter, a discovery (virtual discovery) in the band of 5 GHz is together processed based on information (channel information for two or more bands) acquired in the band of 2.4 GHz to complete channel information (primary channel and sub channel information) discovery for both bands before detecting the beacon signal in the band of 5 GHz.

Figure 11:
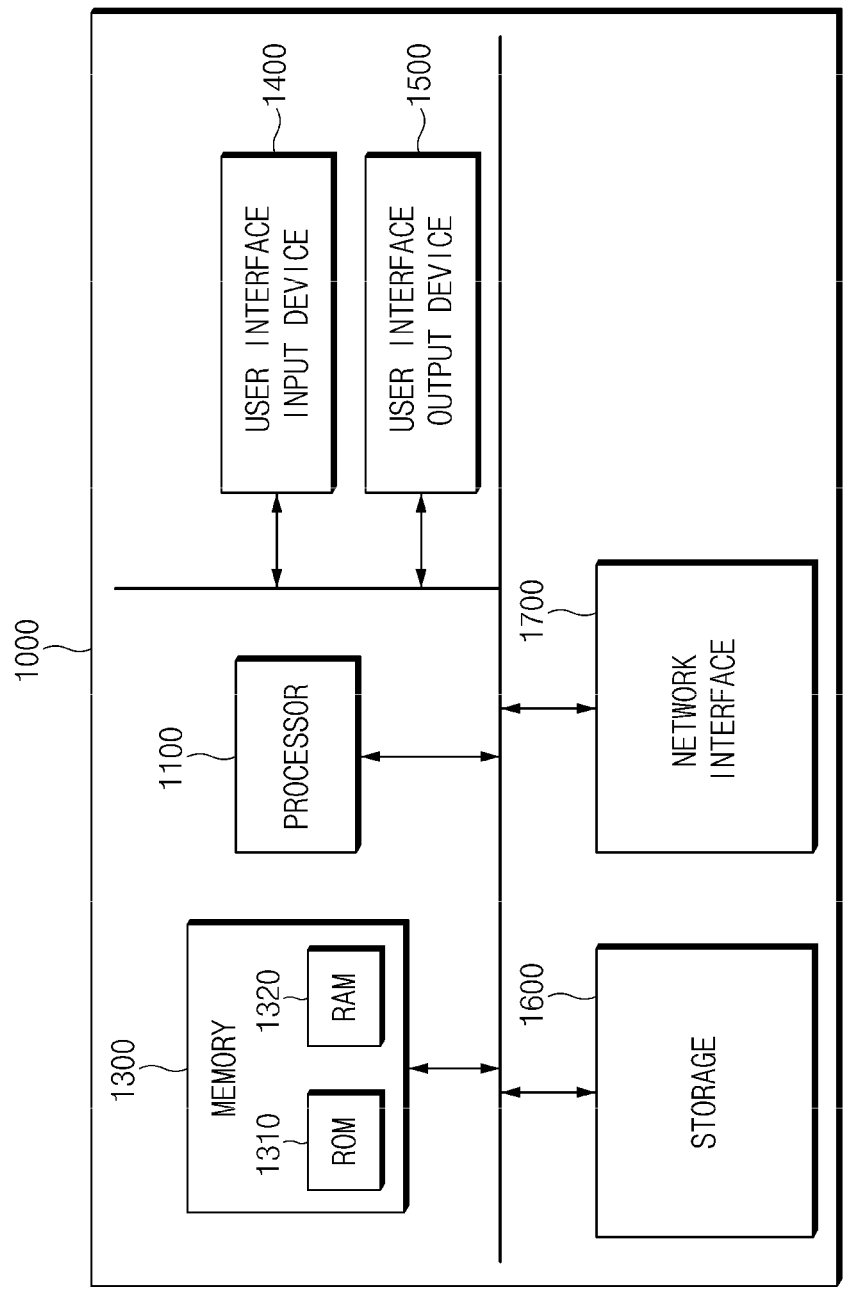
FIG. 11 is a diagram for describing an example of a method for implementing components of a wireless LAN system according to an embodiment of the present invention.

FIG. 11 is a diagram for describing an example of a method for implementing components including an AP, an STA, and the like of a wireless LAN system 100 according to an embodiment of the present invention. The components including the AP, the STA, and the like of the wireless LAN 100 according to the embodiment of the present invention may be constituted by hardware, software, or combinations thereof. For example, the components including the AP, the STA, and the like of the wireless LAN 100 may be implemented as a computing system 1000 as illustrated in FIG. 11.

The computing system 1000 may include at least one processor 1100, a memory 1300, a user interface input device 1400, a user interface output device 1500, a storage 1600, and a network interface 1700 connected through a bus 1200. The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320. Therefore, steps of a method or an algorithm described in association with the embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in the user terminal. As yet another method, the processor and the storage medium may reside in the user terminal as individual components.

Further, the embodiments of the present invention may be implemented in a program command form executable by various computer means and recorded in a computer readable medium. The computer readable medium may include one or a combination of a program command, a data file, and a data structure. The program command recorded in the computer-readable medium may be specially designed and configured for the embodiments of the present invention, or may be publicly known to and used by those skilled in the computer software field. The computer-readable medium may mean a hardware device particularly configured to store and execute a program command, such as the ROM, the RAM, a flash memory, or the like. The hardware device may be configured to be operated with one or more software modules in order to perform the operation of the embodiment of the present invention, and an opposite situation thereof is also available. The program command may mean a machine language code as if being prepared by a compiler and a high-class language code which may be executed in a computer based on an interpreter, and the like.

As described above, according to the wireless LAN system 100 for discovering an adjacent neighboring AP between APs in a wireless LAN using multi-bands according to the present invention, in the case of an AP using the multi-bands, since it is important to set a priority for an AP which needs to preferentially execute channel switching for interference avoidance according to band and channel interference degrees with an adjacent AP, a primary channel of the AP using the multi-bands is preferentially detected and further, channel detection between adjacent APs in a channel in which a sub channel exists is preferentially executed according to a channel arrangement criterion determined in a wireless LAN standard based on channel width information included in the primary channel to more rapidly recognize interference between the adjacent APs depending on use of multi-bands and multi-channels. Further, in the case of the AP using the multi-bands, when the APs discover each other through directly detecting a beacon signal or channel detection using a terminal in a cell coverage overlapping area in one band, a discovery of another band is not separately performed and the discovery of another band is performed based on information obtained in one band, thereby minimizing overhead of a channel detection time required for a discovery in the multi-bands, or the like.

The above description just illustrates the technical spirit of the present invention and various modifications and transformations can be made to those skilled in the art without departing from an essential characteristic of the present invention.

Therefore, the embodiments disclosed in the present invention are used to not limit but describe the technical spirit of the present invention and the scope of the technical spirit of the present invention is not limited by the embodiments. The scope of the present invention should be interpreted by the appended claims and it should be analyzed that all technical spirit in the equivalent range is intended to be embraced by the present invention.

The invention claimed is:

1. A method for discovering adjacent APs in a wireless LAN AP, the method comprising:
   acquiring first channel scanning information by searching operating channels for one or more first adjacent APs in one or more respective access points (APs) distributed on the wireless LAN;
   collecting second channel scanning information for one or more second adjacent APs acquired by one or more terminals distributed on the wireless LAN in one or more APs; and
   transmitting a hidden AP existence announcement message including operating channel information for a hidden AP to a specific terminal among one or more terminals by comparing the first channel scanning information and the second channel scanning information in one or more APs,
   wherein the operating channel information for the hidden AP is updated to be added to a neighbor AP list in one or more other APs that receive the hidden AP existing announcement message broadcasted by the specific terminal.

2. The method for discovering adjacent APs in a wireless LAN AP of claim 1, wherein the specific terminal is a terminal that exists in an overlapping area of cell coverage of a plurality of APs.

3. The method for discovering adjacent APs in a wireless LAN AP of claim 1, wherein the specific terminal is a terminal that detects operating channel information for the most APs among a plurality of terminals providing the second channel scanning information.

4. The method for discovering adjacent APs in a wireless LAN AP of claim 1, wherein in the acquiring of the first channel scanning information, with respect to each of the multi-bands, primary channel information is detected with respect to each first adjacent AP and sub channel information which exists to correspond to a primary channel is detected according to channel arrangement information and channel detection between adjacent APs in a channel in which a sub channel exists is preferentially executed in order to more rapidly recognize interference with the adjacent APs.

5. The method for discovering adjacent APs in a wireless LAN AP of claim 4, wherein the primary channel information and the sub channel information are detected from a beacon signal including channel information for multi-bands from the corresponding adjacent AP and a discovery of another band is not separately performed and primary channel information and sub channel information for the another band are detected by using channel information of n (n is a natural number) other bands included in the beacon signal.

6. The method for discovering adjacent APs in a wireless LAN AP of claim 4, wherein the first adjacent AP is divided into a single-band single-channel adjacent AP, a single-band multi-channel adjacent AP, a multi-band single channel adjacent AP, or a multi-band multi-channel adjacent AP according to whether multi-channels overlapping with each other and whether multi-bands overlapping with each other to acquire operating channel information for each divided adjacent AP type as the first channel scanning information.

7. The method for discovering adjacent APs in a wireless LAN AP of claim 6, wherein the acquiring of the first channel scanning information includes determining an order in which a priority increases as the order of the single-band single-channel adjacent AP, the single-band multi-channel adjacent AP, the multi-band single-channel adjacent AP, and the multi-band multi-channel adjacent AP and determining the multi-band multi-channel adjacent AP as a first priority interference avoidance target.

8. The method for discovering adjacent APs in a wireless LAN AP of claim 1, wherein in the collecting of the second channel scanning information, with respect to each of the multi-bands, one or more terminals detect the primary channel information for each second adjacent AP and detect the sub channel information which exists to correspond to the primary channel according to the channel arrangement information to acquire operating channel information including the detected primary channel information and sub channel information as the second channel scanning information.

9. The method for discovering adjacent APs in a wireless LAN AP of claim 1, further comprising:
   transmitting, according to a response to the specific terminal in an AP that receives the hidden AP existence announcement message, a confirm message including connection setup information with the hidden AP to the AP to which the specific terminal transmits the hidden AP existence announcement message; and
   setting up, by the AP that receives the confirm message, connection with the hidden AP through the specific terminal according to the connection setup information with the hidden AP.

10. A wireless LAN AP comprising:
    a channel searching unit searching operating channels with respect to one or more respective access points (APs) distributed on a wireless LAN;
    a channel detecting unit acquiring first channel scanning information based on information of the operating channels for one or more first adjacent APs searched by the channel searching unit;
    a discovery unit collecting second channel scanning information for one or more second adjacent APs acquired by one or more terminals distributed on the wireless LAN and detecting a hidden AP by comparing the first channel scanning information and the second channel scanning information; and
    a messaging unit transmitting a hidden AP existing announcement message including operating channel information for the hidden AP to a specific terminal among one or more terminals with the detection of the hidden AP, wherein the operating channel information for the hidden AP is updated to be added to a neighbor AP list in one or more other APs that receive the hidden AP existence announcement message broadcasted by the specific terminal.

11. The wireless LAN AP of claim 10, wherein the specific terminal is a terminal that exists in an overlapping area of cell coverage of a plurality of APs.

12. The wireless LAN AP of claim 10, wherein the specific terminal is a terminal that detects operating channel information for the most APs among a plurality of terminals providing the second channel scanning information.

13. The wireless LAN AP of claim 10, wherein with respect to each of the multi-bands, the channel searching unit detects primary channel information with respect to each first adjacent AP and the channel detecting unit detects, sub channel information which exists to correspond to the primary channel according to channel arrangement information based on the primary channel information and preferentially executes channel detection between adjacent APs in a channel in which a sub channel exists in order to more rapidly recognize interference with the adjacent APs.

14. The wireless LAN AP of claim 13, wherein the primary channel information and the sub channel information are detected from a beacon signal including channel information for multi-bands from the corresponding adjacent AP and a discovery of another band is not separately performed and primary channel information and sub channel information for the another band are detected by using channel information of n (n is a natural number) other bands included in the beacon signal.

15. The wireless LAN AP of claim 13, wherein the channel detecting unit divides the first adjacent AP into a single-band single-channel adjacent AP, a single-band multi-channel adjacent AP, a multi-band single channel adjacent AP, or a multi-band multi-channel adjacent AP according to whether multi-channels overlapping with each other and whether multi-bands overlapping with each other to acquire operating channel information for each divided adjacent AP type as the first channel scanning information.

16. The wireless LAN AP of claim 15, wherein the channel detecting unit determines an order in which a priority increases as the order of the single-band single-channel adjacent AP, the single-band multi-channel adjacent AP, the multi-band single-channel adjacent AP, and the multi-band multi-channel adjacent AP and determines the multi-band multi-channel adjacent AP as a first priority interference avoidance target.

17. The wireless LAN AP of claim 10, wherein with respect to each of the multi-bands, one or more terminals detect the primary channel information for each second adjacent AP and detect the sub channel information which exists to correspond to the primary channel according to the channel arrangement information to acquire operating channel information including the detected primary channel information and sub channel information as the second channel scanning information.

18. The wireless LAN AP of claim 10, further comprising:
a connection setup unit setting up connection with the hidden AP through the specific terminal according to connection setup information with the hidden AP when receiving a confirm message including the connection setup information with the hidden AP from the specific terminal according to a response to the specific terminal in an AP that receives the hidden AP existence announcement message.

\* \* \* \* \*